(12) United States Patent
Shevela

(10) Patent No.: US 6,655,426 B2
(45) Date of Patent: Dec. 2, 2003

(54) PRE-LUBRICATING APPARATUS AND METHOD

(75) Inventor: Michael Shevela, Harrison Township, MI (US)

(73) Assignee: SPX Corporation, Charlotte, NC (US)

( * ) Notice: Subject to any disclaimer, the term of this patent is extended or adjusted under 35 U.S.C. 154(b) by 20 days.

(21) Appl. No.: 10/003,410

(22) Filed: Dec. 6, 2001

(65) Prior Publication Data

US 2003/0106611 A1 Jun. 12, 2003

(51) Int. Cl.[7] .............................................. F16N 19/00
(52) U.S. Cl. ........................ 141/382; 141/98; 141/383; 184/1.5
(58) Field of Search ........................ 141/1, 98, 25–27, 141/65, 382–386; 184/1.5, 106

(56) References Cited

U.S. PATENT DOCUMENTS 1,439,295 A * 12/1922 Craig ........................... 141/26
5,454,960 A * 10/1995 Newsom ...................... 210/805
5,474,098 A * 12/1995 Grigorian et al. ........ 134/169 A
5,791,310 A * 8/1998 Grigorian et al. ........ 123/196 A \* cited by examiner Primary Examiner—Gregory L. Huson
Assistant Examiner—Peter deVore
(74) Attorney, Agent, or Firm—Baker & Hostetler LLP

(57) ABSTRACT

An apparatus and method supplies lubricating fluid to an oil lubricating fluid receiving port of a mechanical device. A tank is adapted to hold the lubricating fluid, and a manually operated pump is mounted to the tank. A hose extends from the pump, so that the pump when operated pumps lubricating fluid from the tank into the hose. A shut-off valve is located at an end of the hose, and is manually moveable between an open position and a closed position. An adapter is attached to the shut-off valve and also attaches to the lubricating fluid receiving port, so that operation of the pump when the shut-off valve is in the open position forces lubricating fluid through the tube and through the adapter and into the lubricating fluid receiving port.

24 Claims, 3 Drawing Sheets

PRE-LUBRICATING APPARATUS AND METHOD

FIELD OF THE INVENTION

The present invention relates to a method and apparatus for providing lubrication to a mechanical device. More particularly, the present invention relates to a method and apparatus for providing lubrication to an internal combustion engine which is not operating and may be in partially or fully assembled condition.

BACKGROUND OF THE INVENTION

An internal combustion engine has many locations where metal-to-metal frictional contact occurs between components. Such frictional contact locations include, for example, crank shaft bearings, cam shafts, valve lifters, connecting rods, and piston rings. They also include journal bearings, roller bearings, sliding cam contacts, and other rotating and/or sliding frictional contacts. These frictional contact locations are often subjected to high loads when the engine is operating. They may also be subject to friction at times when an engine is being assembled and/or rebuilt.

During engine operation, it is known for engines to circulate oil in order to lubricate these frictional parts. In some engines, there will be one or a large number of oil receiving ports through which oil enters, and these ports lead to various oil passages in the engine that carry oil to and from the frictional contact areas. Generally, engines have an oil reservoir or sump, and a pump that draws oil from the reservoir or sump and positively pressurizes it into the various oil receiving ports in order to supply oil under pressure while the engine is running. The oil is supplied under pressure to the ports so that it is forced to the various oil passages and can provide a desirable oil bath and/or oil film at the friction contact areas.

In the case of an engine that has been fully assembled but not yet operated, the frictional contact areas generally do not have any engine oil present. Even if an effort is made to wipe some oil on the various parts as they are assembled, this generally does not provide a very adequate or evenly distributed film of oil. As a result of this, as the engine is being assembled, if it is necessary to rotate or move parts against each other, for example, to align the parts for further assembly, sufficient lubricating oil may not be present.

Further, when the engine is first operated, sufficient lubricating is not present until the pump is able to circulate oil. Accordingly, when an engine is started in this condition, there is an initial time while the engine is operating before the oil pump is able to disperse oil under pressure through the engine. During this initial operating time, component parts may be subject to undesirable friction and/or wear due to the metal-to-metal contact before the oil under pressure reaches the friction contact areas. It would be desirable to be able to lubricate and engine during and/or after assembly before the engine is started.

Oil also can inhibit corrosion of parts. Since a partially assembled engine may be stored for a period of time before the assembly process is completed, it can be desirable to be able to provide a thorough lubrication of the partially assembled engine to reduce corrosion. It can be difficult or impossible to achieve sufficient oil coverage by merely wiping the parts with oil during assembly.

This problem of lack of a sufficient oil film is particularly severe in the context of a newly assembled engine, which at most has only some oil that has been manually wiped on the parts during assembly. However, the problem is also present even for engines that have been operated, and have been stopped and then are restarted. In such a case, during the initial time of engine operation, the parts have frictional contact, but the oil under pressure takes some time to be fully distributed. In the case of an engine that has been operated recently, there may be some residual oil present. However this residual oil may sometimes not be adequate to avoid wear and friction problems, and the longer the amount of time that the engine has been inoperative, the less residual oil film there will be. Consequently, an engine that has not been operated in a very long time may suffer a situation similar to that of an engine that has only just been assembled.

In an effort to alleviate the problem of lack of oil pressure immediately following the start up of an engine that is in full operating condition, it has been known to provide an electrical pump that is operated before the engine is started in order to begin supplying pressurized oil to the various passages. However, this arrangement is complex in that it requires the addition of an additional electric pump that is attached to the engine and which requires power to operate during the time before the engine is started. The need for a power supply and motorized pump add to the cost of the engine. Also, these systems are generally mounted to the engine and integrated with the engine so that they are not readily removed and are not portable. It would be desirable to have a system for lubricating an engine that is self-contained and portable and that can be easily and rapidly hooked up to engine ports to lubricate at least part of an engine.

Further, the systems that have been used to prelubricate engines at start-up provide a substitute way of operating the full oil circulation and supply oil to all ports before the engine is started. Because of this, these prior art arrangements do not provide the ability to selectively insert pressurized oil into one or more ports at an intermediate step during assembly of an engine. These prior art devices also do not provide a convenient mechanism for an engine assembler to prelubricate selected areas of an engine during different stages along the assembly process.

Accordingly, there is a need in the art for a simple and inexpensive method and apparatus for prelubricating an engine that can be used whether or not the engine is fully assembled, which can selective lubricate various engine oil ports, and which is portable and does not require a power supply to operate.

SUMMARY OF THE INVENTION

The present invention can provide a simple and inexpensive method and apparatus for pre-lubricating an engine that can be used whether or not the engine is fully assembled, which can selective lubricate various engine oil ports, and which is portable and does not require a power supply to operate.

The invention in some embodiments also provides an apparatus and method that supplies lubricating fluid to an oil lubricating fluid receiving port of a mechanical device.

In one aspect of the invention, a tank is adapted to hold the lubricating fluid, and a manually operated pump is mounted to the tank. A hose extends from the pump, so that the pump when operated pumps lubricating fluid from the tank into the hose. A shut-off valve is located at an end of the hose, and is manually moveable between an open position and a closed position. An adapter is attached to the shut-off valve and also attaches to the lubricating fluid receiving port, so that operation of the pump when the shut-off valve is in the open position forces lubricating fluid through the tube and through the adapter and into the lubricating fluid receiving port.

In another aspect of the invention, an apparatus is provided for supplying lubricating fluid to an oil receiving port of a mechanical device. The apparatus has means for containing lubricating fluid; a hose; a manually operated means for pumping lubricating fluid from the containing means into the hose; and shut-off means located at the end of the hose, the shut-off means being manually moveable between an open position and a closed position. The apparatus also has attaching means, located on the shut-off means, for attaching with the lubricating fluid receiving port, wherein operation of the pumping means when the shut-off means is in the open position forces lubricating fluid through the hose and through the attaching means into the lubricating fluid port.

In still another aspect of the invention, the invention provides a method for providing lubricating fluid to a lubricating fluid receiving port of a mechanical device. The method includes filling a tank at least partially with the lubricating fluid, attaching an adapter located at an end of a hose to the lubricating fluid receiving port, and manually pumping lubricating fluid from the tank to the adapter via a hose, using a manual pump mounted to the tank There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
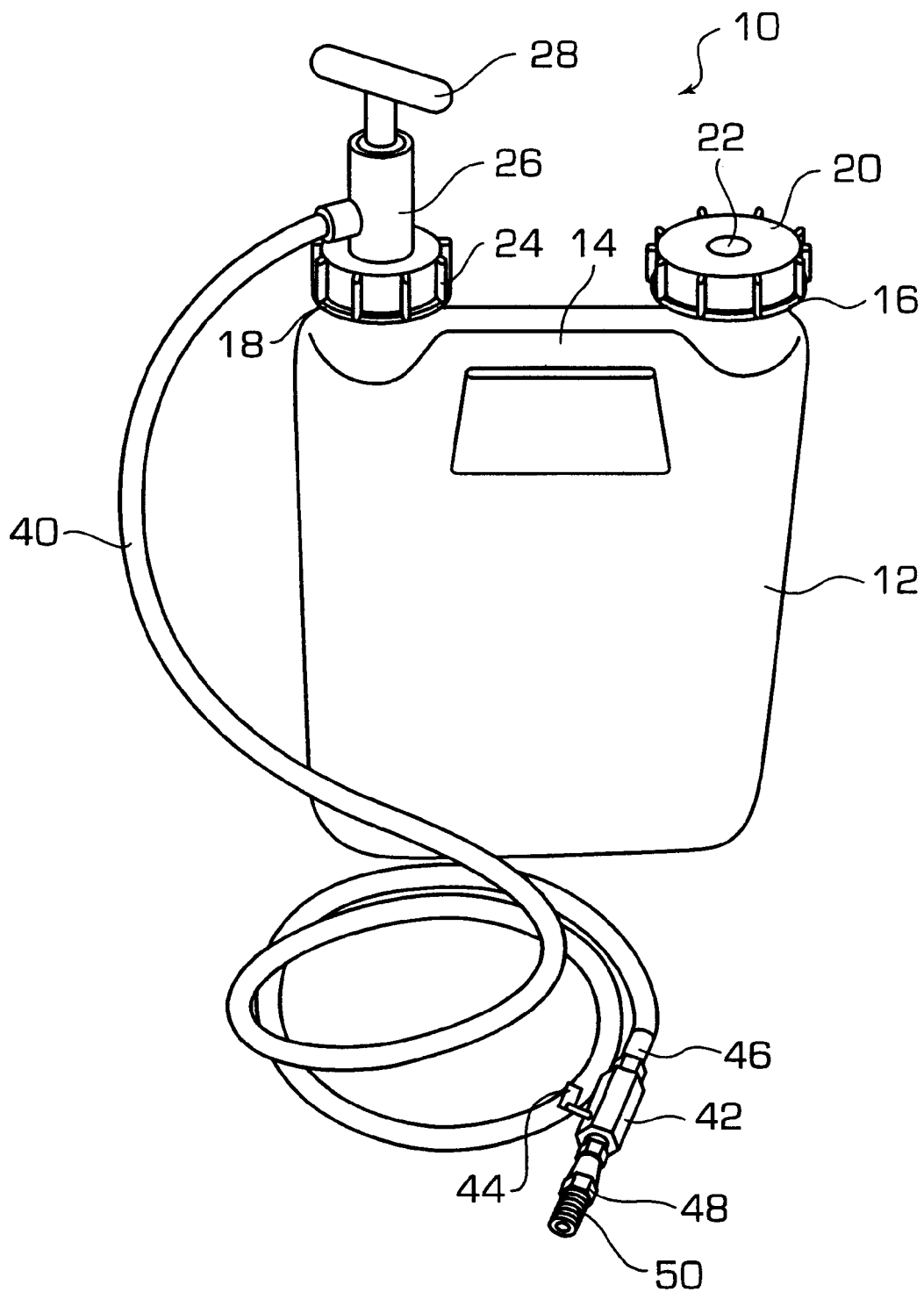
FIG. 1 is a perspective view of an apparatus according to a preferred embodiment of the invention.
Figure 2:
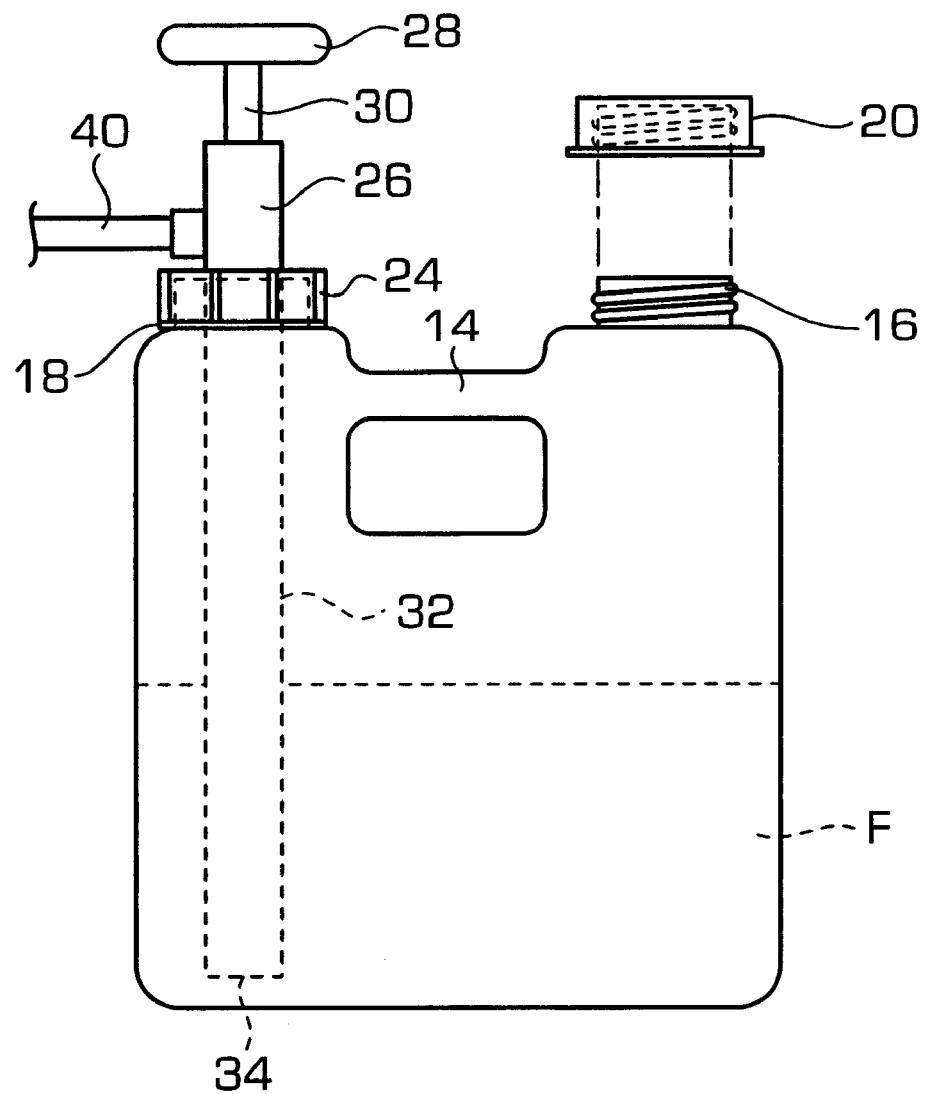
FIG. 2 is a side view of the apparatus shown in FIG. 1, showing a reservoir and pump assembly, with a first end of a hose extending from the assembly and the second end of the hose cutaway.

As seen in FIGS. 1 and 2, the prelubricating apparatus 10 includes a reservoir tank 12 having a handle 14. In a preferred embodiment, the reservoir tank 12 is approximately a two gallon hollow plastic container, which may be molded so that it has a handle portion 14 as shown. FIG. 2 shows that the tank 12 has two threaded top openings 16 and 18, which may be integral or may be different from each other. The fill and vent opening 16 accepts a complimentary threaded cap 20 as shown. The fill opening 16 is large enough so that oil may conveniently be poured into the tank 12. It may be desirable to size the opening 16 so that a typical oil spout, funnel, or other oil dispenser may be accommodated for receiving oil during filling of the container.

Returning to FIGS. 1 and 2, the cap 20 may include a vent 22. The vent 22 can operate to allow air into the container when the oil is dispensed as described in more detail below. The threaded opening 18 is similar to the opening 16 and accepts a cap 24 which secures a pump 26 as shown. Pump 26 has a handle 28, shaft 30, and pump cylinder 32. When a tank 12 of fluid is to be stored, whether empty or at least partially full, the pump 26 can be removed and a second cap 20 used to close off the opening 18. By virtue of this, multiple tanks 12 holding different fluids can be used with a single pump 26 and tubular hose 40 by transferring the pump 26 and hose 40 between tanks. However, it may be necessary to operate the pump 26 several times to flush out the previous fluid when the pump 26 is transferred to a different tank 12.

In the preferred embodiment, the tank 12 is made from at least partially translucent material, such as translucent or clear plastic, so that the level of the lubricating fluid inside the tank 12 is visible to the user.

The cylinder 32 of the pump 26 extends down towards the bottom of the tank 12 inside the tank 12. The pump cylinder 32 is a housing that has a plunger connected to the shaft 30 that travels slidably inside the pump cylinder 32. The oil inlet opening 34, which is near the bottom of the tank 12, is able to draw the fluid F from inside the tank 12 upwardly through the pump cylinder 32. The handle 28 is manually reciprocated up and down to pump fluid out of the tank 12.

Manually reciprocating the handle 28 therefore draws fluid out of the tank 12 and pushes fluid under pressure out of the pump 26 and into a tube 40, which is preferably a clear plastic tube. A first end of the plastic tube 40 is attached to the oil outlet of the pump 26 and the second end of the plastic tube 40 is attached to an on/off shut-off valve 42. The shut-off valve 42 has a lever type handle 44 that can be manually rotated between fully open and fully closed positions.

Figure 3:
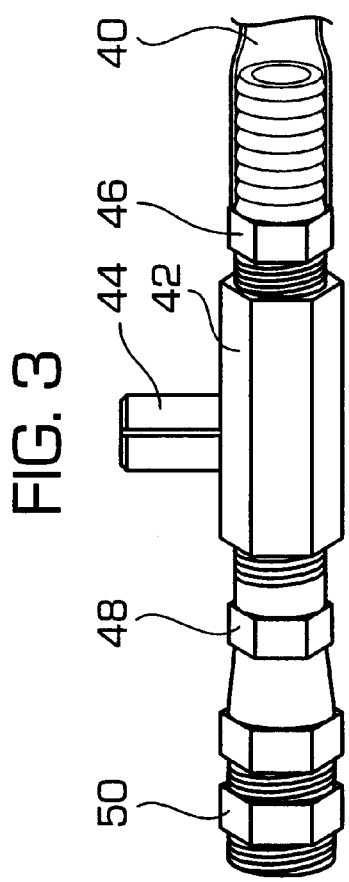
FIG. 3 is a detailed view of a shut-off valve an adapter assembly, with the second end of the hose according to the embodiment of FIG. 1 shown and the first end of the hose cutaway.

Turning to FIG. 3, the shut-off valve has an inlet fitting 46 which is shaped to receive the end of the clear plastic tube 40. This permits the user to see when oil has reached the shut-off valve, and permits the user to see that oil is reaching the shut-off valve 42. The inlet fitting 46 may include a tapered end sized to receive the plastic tube 40 that is threaded onto complimentary threads on the inlet end of the shut-off valve 42. The inlet fitting can also have a free-rotation feature, so that the shut-off valve 42 is free to rotate separately from the tube 40.

An outlet adapter 48 is provided at the other end of the shut-off valve 42. This adapter may also fit into complimentary threads on the shut-off valve 42. This way, both adapters 46 and 48 are capable of being interchanged, and therefore different sized adapters 46 and 48 can be used to fit different sizes of plastic tubes and/or engine ports. The outlet fitting 48 is threadably attached an engine adapter 50. The inlet fitting can also have a free-rotation feature, so that the shut-off valve 42 is free to rotate separately from the adapter 50.

The engine adapter 50 is a fitting threaded at both ends which screws into an engine oil inlet in the engine that is being prelubricated. Thus, the adapter 50 fits into an engine oil port that leads to an engine oil passage in the engine. Since there are many different sizes of engine oil ports, a number of different sizes and threads of adapters can be used, such as adapters 51, 52, 53, 54, 55, 56, and 57 shown in FIG. 4.

Figure 4:
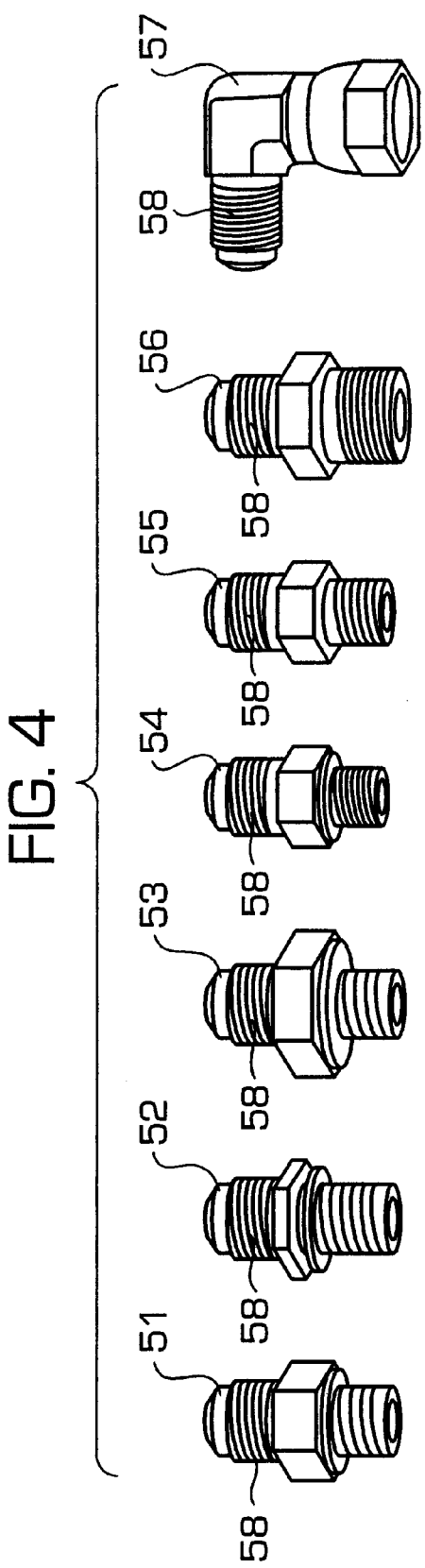
FIG. 4 is a view showing several adapter components that can be used with the present invention.

FIG. 4 depicts exemplary adapters 51–56 showing different sizes and threads for fittings that may be used. Note that at one end each of these fittings have the same threads 58, which are shaped to fit into the adapter 48, and at the other end different threads are used to accommodate different engine ports. Adapter 57 is a right angle piece that can be used with another adapter 51–56 when there is limited clearance around the engine port being used.

In a preferred embodiment, the tank 12 is made of molded plastic, and the caps 20 and 24 are also molded plastic parts. The pump 26 can be made of steel or plastic with rubber seals. The shut-off valve 42 also has a steel body. The fittings 46 and 48 and the adapters 51–57 are made of brass or steel as desired.

The user operates the apparatus 10 as follows. First, the tank 12 is filled with oil by removing the cap 20 and filling it through the opening 16. The cap 20 may then be replaced. After filling the container 12 at least partially, the operator closes the valve 42 so that oil does not inadvertently escape from the valve 42 while the apparatus is being carried over to the engine.

At this time, the user selects an appropriate engine adapter 50 and installs it either into the engine oil port or onto the end of the shut-off valve 42. The adapter 50 is chosen to fit the oil port to which oil is being supplied. Note that the fitting 48 can be designed with a free-rotation feature to permit the adapter 50 to be screwed into the engine port without needing to rotate the shutoff valve 42.

Once the adapter 50 has been secured in the engine port, and the shutoff valve 42 is attached to the adapter 50 via the fitting 48, the shut-off valve 42 is moved to the open position by rotating the lever 44. Then, the user operates the pump 26 by reciprocating the handle 28 to pump engine oil into the engine.

Depending on which engine port is being supplied with oil by the apparatus 10, oil will flow into the appropriate oil passage and will lubricate cam shaft, valve lifters, journals, bearings, piston rings, and/or other parts that are in the path of the oil passage. Depending on the degree of assembly of the engine, the user can observe the flow of oil, and can determine when sufficient oil appears to have passed through the engine parts being lubricated.

As the pump 26 is operated, the level of the oil F in the container will drop. To accommodate this, the cap 20 may have an air inlet valve 22 that permits air to enter the container 12 to fill up the airspace over the oil fluid F. The valve 22 maybe designed to allow air to enter the container 12, but does not allow oil to escape, for example if the container 12 is tipped over.

The application refers to oil as the lubricating material being dispensed by the apparatus 10. However, it is to be understood that the invention is suitable for use with other lubricating materials, including for example grease, synthetic lubricants and/or fluids having lubricating and/or anti-corrosive properties. In addition, although the application uses as an example an internal combustion engine, the invention may be suitable for use with other types of engines and/or other equipment that has friction contact locations and oil receiving ports.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for supplying lubricating fluid to an oil lubricating fluid receiving port of a mechanical device, the apparatus comprising:

a tank adapted to hold the lubricating fluid, wherein the tank has a first opening and a second opening for filling the tank at least partially with the lubricating fluid, and a handle integrally formed as part of the tank;

a manually operated pump mounted to the tank at the first opening;

a hose extending from the pump, so that the pump when operated pumps lubricating fluid from the tank into the hose;

a shut-off valve located at an end of the hose, the shut-off valve being manually moveable between an open position and a closed position; and an adapter attached to the shut-off valve that also attaches to the lubricating fluid receiving port, wherein operation of the pump when the shut-off valve is in the open position forces lubricating fluid through the hose and through the adapter and into the lubricating fluid receiving port.

2. An apparatus according to claim 1, wherein the pump is a reciprocating pump.

3. An apparatus according to claim 1, wherein the tank has a first opening and a second opening, and wherein the pump is removeably mounted to the tank at the first opening, and the apparatus further comprises a cap for selectively sealing off the second opening.

4. The apparatus according to claim 1, wherein the tank is made from a partially translucent material.

5. An apparatus according to claim 1, wherein the shut-off valve comprises a fitting and the adapter is removeably secured to the fitting and removeably mates with the lubricating fluid receiving port.

6. An apparatus according to claim 1, wherein the fitting has two pieces that are rotatable relative to each other, so that the adapter can be rotated independently of the shut-off valve.

7. An apparatus according to claim 1, further comprising a plurality of the adapters, each adapter having a first end substantially identical to the first end of the other adapters, and each adapter having a second end sized to fit different threads of a lubricating fluid receiving port.

8. An apparatus according to claim 1, wherein the mechanical device is an internal combustion engine.

9. An apparatus according to claim 1, wherein the lubricating fluid is oil.

10. An apparatus according to claim 1, wherein the mechanical device is an internal combustion engine and the lubricating fluid is engine oil.

11. An apparatus according to claim 1, further comprising a second cap for selectively sealing the first opening.

12. An apparatus according to claim 11, wherein the first and second caps are interchangeable.

13. An apparatus according to claim 1, wherein the hose is a clear plastic tube.

14. An apparatus according to claim 1, wherein the tank is at least partially translucent.

15. The apparatus of claim 1, wherein the hose is clear.

16. An apparatus for supplying lubricating fluid to an oil receiving port of a mechanical device, the apparatus comprising:
    means for containing lubricating fluid having a first opening and a second opening for filling the containing means with lubricating fluid;
    a handle means integrally formed in the containing means;
    a hose;
    a manually operated means for pumping lubricating fluid from the containing means into the hose wherein the pumping means is mounted to the containing means at the first opening;
    shut-off means located at the end of the hose, the shut-off means being manually moveable between an open position and a closed position; and
    attaching means, located on the shut-off means, for attaching with the lubricating fluid receiving port, wherein operation of the pumping means when the shut-off means is in the open position forces lubricating fluid through the hose and through the attaching means into the lubricating fluid port.

17. An apparatus according to claim 16, wherein the mechanical device is an internal combustion engine.

18. An apparatus according to claim 16, wherein the lubricating fluid is oil.

19. An apparatus according to claim 16, wherein the mechanical device is an internal combustion engine and the lubricating fluid is engine oil.

20. The apparatus of claim 16, wherein the containing means is made from a partially translucent material.

21. The apparatus of claim 16, wherein the hose is clear.

22. A method for providing lubricating fluid to a lubricating fluid receiving port of a mechanical device, the method comprising the steps of:
    providing a tank adapted to hold the lubrincating fluid, the tank having a first opening and a second opening;
    removeably mounting a manually operated pump to the tank at the first opening;
    filling the tank at least partially with the lubricating fluid through the second opening;
    attaching an adapter located at an end of a hose to the lubricating fluid receiving port; and
    manually pumping lubricating fluid from the tank through the first opening to the adapter via a hose, using a manual pump mounted to the tank.

23. A method according to claim 22, further comprising the step of:
    opening a shut-off valve located between the end of the hose and the adapter prior to performing the pumping step.

24. An apparatus for supply lubricating fluid to an oil lubricating fluid receiving port of a mechanical device, the apparatus comprising:
    a tank adapted to hold the lubricating fluid;
    a manually operated pump mounted to the tank;
    a hose extending from the pump, so that the pump when operated pumps lubricating fluid from the tank into the hose;
    a shut-off valve located a an end of the hose, the shut-off valve being manually movably between an open position and a closed position; and
    a plurality of adapters attached to the shut-off valve that it also attaches to the lubricating fluid receiving port, each adapter having a first end substantially identical to the first end of the other adapters, and each adapter having a second end sized to fit different threads of a lubricating fluid receiving port, wherein operation of the pump when the shut-off valve is in the open position forces lubricating fluid through the hose and through the adapter and into the lubricating fluid receiving port.

* * * * *